(12) United States Patent
Aoki et al.

(10) Patent No.: US 11,645,486 B2
(45) Date of Patent: May 9, 2023

(54) INFORMATION PROCESSING DEVICE, METHOD, AND PRODUCT FOR DERIVING RECOMMENDED PARAMETER FOR FABRIC PRE-PROCESSING OR POST-PROCESSING DEVICE IN FABRIC PRINTING SYSTEM USING INKJET PRINTING DEVICE

(71) Applicant: SEIKO EPSON CORPORATION, Tokyo (JP)

(72) Inventors: Hiroki Aoki, Matsumoto (JP); Tsuneyuki Sasaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 9 days.

(21) Appl. No.: 17/452,597

(22) Filed: Oct. 28, 2021

(65) Prior Publication Data

US 2022/0134773 A1 May 5, 2022

(30) Foreign Application Priority Data

Oct. 30, 2020 (JP) .............................. JP2020-182406

(51) Int. Cl.
*G06K 15/02* (2006.01)
*G06K 15/10* (2006.01)
*B41J 3/407* (2006.01)

(52) U.S. Cl.
CPC ....... *G06K 15/1872* (2013.01); *G06K 15/021* (2013.01); *G06K 15/102* (2013.01); *G06K 15/1822* (2013.01); *G06K 15/1825* (2013.01); *G06K 15/1868* (2013.01); *B41J 3/4078* (2013.01)

(58) Field of Classification Search
None
See application file for complete search history.

(56) References Cited

U.S. PATENT DOCUMENTS 9,278,544 B2 * 3/2016 Hayafuchi ............. B41J 11/009
11,468,278 B2 * 10/2022 Aoki .................... G06K 15/102
(Continued)

FOREIGN PATENT DOCUMENTS

| JP | 2004-174943 A | 6/2004 |
| JP | 2020-046933 A | 3/2020 |
| JP | 2020-046934 A | 3/2020 |

*Primary Examiner* — Scott A Rogers
(74) *Attorney, Agent, or Firm* — Workman Nydegger

(57) ABSTRACT

An information processing device includes an acquisition unit acquiring pre-printing image data that is obtained by digitizing, as an image, the fabric before the printing process is performed and at least one of pre-drawing image data that is obtained by digitizing, as an image, the fabric after the pre-processing is performed and before the image is drawn and post-drawing image data that is obtained by digitizing, as an image, the fabric before the post-processing is performed and after the image is drawn, a storage unit storing derivation data indicating a correspondence relationship between the pre-printing image data, the pre-drawing image data or the post-drawing image data, and a recommended parameter for at least one of the pre-processing device and the post-processing device, and a control unit deriving, based on the derivation data, the recommended parameter from the pre-printing image data, the pre-drawing image data or the post-drawing image data.

8 Claims, 7 Drawing Sheets

(56) References Cited

U.S. PATENT DOCUMENTS

| | | |
|---|---|---|
| 2020/0090317 A1 | 3/2020 | Sugimoto et al. |
| 2021/0162775 A1* | 6/2021 | Kayahara ............... H04N 1/387 |
| 2022/0134774 A1* | 5/2022 | Aoki ..................... G06F 3/1273 |
| | | 347/104 |
| 2022/0134775 A1* | 5/2022 | Aoki ..................... G06F 3/1256 |
| | | 347/104 |
| 2022/0134779 A1* | 5/2022 | Aoki ..................... B41J 3/4078 |
| | | 347/5 |

* cited by examiner

| RESOLUTION (dpi) | 1200 | 600 | 240 | 120 | 60 | 24 |
|---|---|---|---|---|---|---|
| DEFINITION (μm/dot) | 21 | 42 | 106 | 212 | 423 | 1058 |
| PRE-PRINTING IMAGE |  |  |  |  |  |  |
| SPECTRAL IMAGE |  |  |  |  |  |  |

INFORMATION PROCESSING DEVICE, METHOD, AND PRODUCT FOR DERIVING RECOMMENDED PARAMETER FOR FABRIC PRE-PROCESSING OR POST-PROCESSING DEVICE IN FABRIC PRINTING SYSTEM USING INKJET PRINTING DEVICE

The present application is based on, and claims priority from JP Application Serial Number 2020-182406, filed Oct. 30, 2020, the disclosure of which is hereby incorporated by reference herein in its entirety.

BACKGROUND

1. Technical Field

The present disclosure relates to an information processing device, an information processing method, and a program thereof.

2. Related Art

JP-A-2004-174943 describes a printing printer system for performing a printing process on a fabric. The printing printer system includes, for example, a pre-processing device that performs pre-processing on the fabric, an inkjet device that draws an image on the fabric that has been subjected to the pre-processing, and a post-processing device that performs post-processing on the fabric at which the image has been drawn.

In the printing printer system, in order to obtain predetermined image quality, appropriate parameters of each device are different depending on a feature value of the fabric such as a thickness, density, surface roughness, etc. of yarns constituting the fabric. The feature value of such a fabric varies as a result of the pre-processing or the image being drawn.

In the printing printer system, for example, a fabric that has been pre-processed in advance may be treated, or a fabric at which an image has been drawn in advance may be treated. When performing the printing process on such a fabric, it is preferable to grasp the conditions related to the pre-processing performed in advance and the conditions related to the drawing of the image performed in advance. However, it may be difficult for a user to know such conditions. In this case, a user needs to set appropriate parameters by repeating the printing process while changing the parameters of the pre-processing and post-processing device. As a result, operation of the user may become cumbersome.

SUMMARY

An information processing device for solving the above-described problems includes an information processing device configured to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the information processing device including an acquisition unit configured to acquire pre-printing image data and at least one of pre-drawing image data and post-drawing image data, the pre-printing image data being obtained by digitizing, as an image, the fabric before the printing process is performed, the pre-drawing image data being obtained by digitizing, as an image, the fabric after the pre-processing is performed and before the image is drawn, the post-drawing image data being obtained by digitizing, as an image, the fabric before the post-processing is performed and after the image is drawn, a storage unit configured to store derivation data configured to indicate a correspondence relationship between the pre-printing image data, the pre-drawing image data or the post-drawing image data, and a recommended parameter for at least one of the pre-processing device and the post-processing device, and a control unit configured to derive, based on the derivation data, the recommended parameter from the pre-printing image data, the pre-drawing image data or the post-drawing image data.

An information processing method for solving the above problems includes an information processing method for processing information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the method including acquiring pre-printing image data and at least one of pre-drawing image data and post-drawing image data, the pre-printing image data being obtained by digitizing, as an image, the fabric before the printing process is performed, the pre-drawing image data being obtained by digitizing, as an image, the fabric after the pre-processing is performed and before the image is drawn, the post-drawing image data being obtained by digitizing, as an image, the fabric before the post-processing is performed and after the image is drawn, and deriving, based on derivation data, a recommended parameter from the pre-printing image data, the pre-drawing image data or the post-drawing image data, the derivation data being configured to indicate a correspondence relationship between the pre-printing image data, the pre-drawing image data or the post-drawing image data, and the recommended parameter for at least one of the pre-processing device and the post-processing device.

A non-transitory computer-readable storage medium for solving the problems described above includes a non-transitory computer-readable storage medium storing a program for causing a computer to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, wherein the program causes the computer to acquire pre-printing image data and at least one of pre-drawing image data and post-drawing image data, the pre-printing image data being obtained by digitizing, as an image, the fabric before the printing process is performed, the pre-drawing image data being obtained by digitizing, as an image, the fabric after the pre-processing is performed and before the image is drawn, the post-drawing image data being obtained by digitizing, as an image, the fabric before the post-processing is performed and after the image is drawn, and derive, based on derivation data, a recommended parameter from the pre-printing image data, the pre-drawing image data or the post-drawing image data, the derivation data being configured to indicate a correspondence relationship between the pre-printing image data, the pre-drawing image data or the post-drawing image data, and the recommended parameter for at least one of the pre-processing device and the post-processing device.

DESCRIPTION OF EXEMPLARY EMBODIMENTS

Hereinafter, the present exemplary embodiment of an information processing device will be described with reference to the drawings. The information processing device is a device for processing information related to a printing process performed by a printing system. First, the printing system is described.

Figure 1:
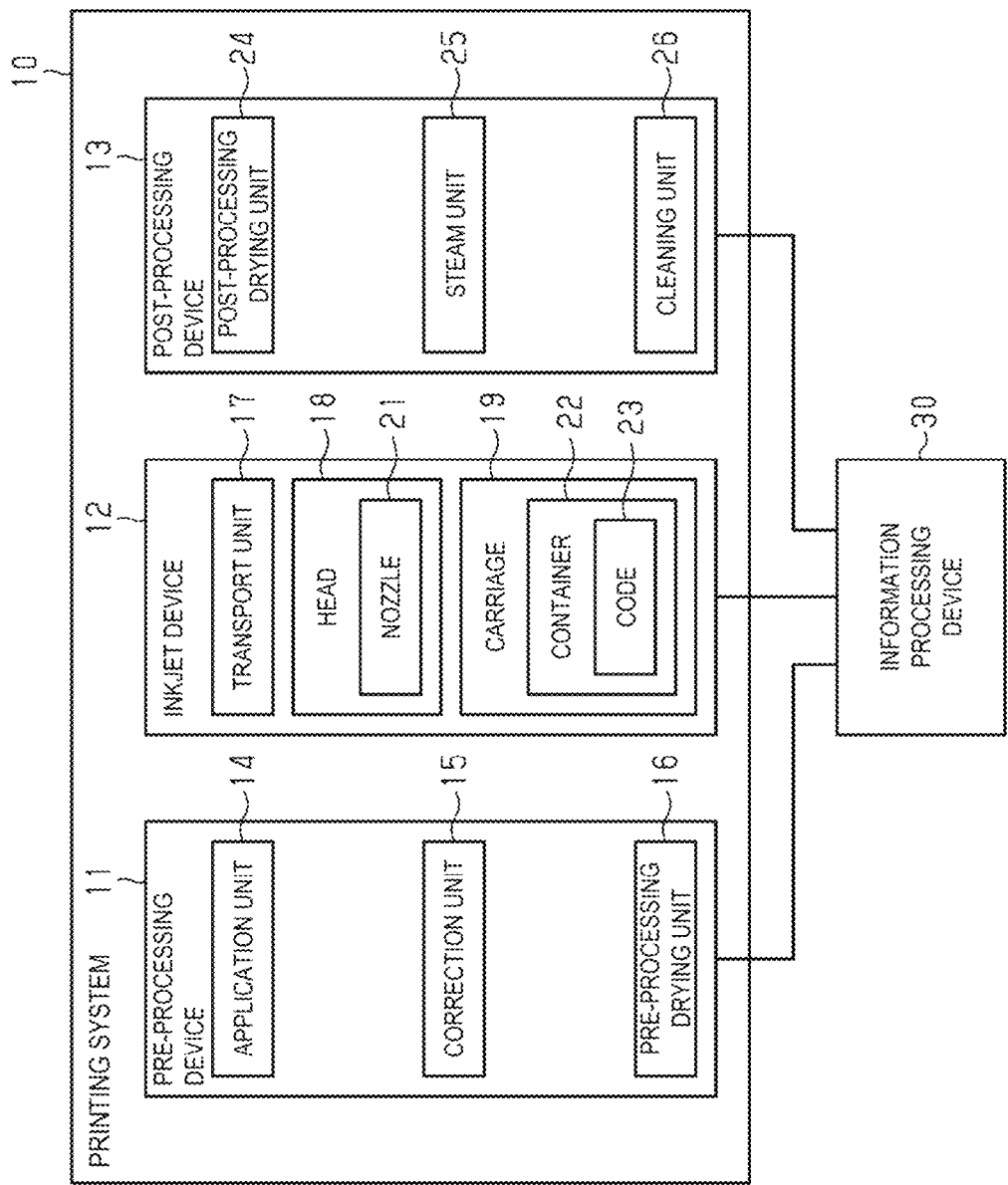
FIG. 1 is a block diagram illustrating a printing system.

As illustrated in FIG. 1, a printing system 10 is constituted by a pre-processing device 11, an inkjet device 12, and a post-processing device 13, for example. The printing system 10 may be constituted by the pre-processing device 11 and the inkjet device 12, or may be constituted by the inkjet device 12 and the post-processing device 13. That is, the printing system 10 includes the inkjet device 12 and at least one of the pre-processing device 11 and the post-processing device 13.

The printing system 10 is a system for performing the printing process on a fabric 99. The printing system 10 performs the printing process on the fabric 99 by three processes, for example, pre-processing, drawing processing, and post-processing. The pre-processing is performed by the pre-processing device 11. The drawing processing is performed by the inkjet device 12. The post-processing is performed by the post-processing device 13.

The printing process is achieved by performing processing on the fabric 99 in an order of the pre-processing, drawing processing, and post-processing, for example. When the printing system 10 is constituted by the pre-processing device 11 and the inkjet device 12, the printing process is achieved by the pre-processing and drawing processing. Where the printing system 10 is constituted by the inkjet device 12 and the post-processing device 13, the printing process is achieved by the drawing processing and post-processing. That is, the printing process is achieved by the drawing processing and at least one of the pre-processing and post-processing.

The printing process may be achieved by a device owned by one user or by cooperation with a device owned by other users. For example, the pre-processing device 11 owned by a first user and the inkjet device 12 and the post-processing device 13 owned by a second user different from the first user may achieve the printing process. In this case, the first user performs the pre-processing on the fabric 99, and the second user performs the drawing processing and post-processing on the fabric 99, whereby the printing process is achieved.

In the printing system 10, coordination may or may not be taken between the devices of the pre-processing device 11, the inkjet device 12, and the post-processing device 13. That is, the pre-processing device 11, the inkjet device 12, and the post-processing device 13 may exchange information to each other or may not exchange information to each other.

The pre-processing device 11 is a device that performs the pre-processing on the fabric 99 before an image is drawn. The pre-processing is a process performed before the drawing processing. The pre-processing device 11 includes, for example, an application unit 14, a correcting unit 15, and a pre-processing drying unit 16.

The application unit 14 is configured to apply pre-processing liquid to the fabric 99. The application unit 14 includes a storage tank that stores the pre-processing liquid, for example. For example, the pre-processing liquid is applied to the fabric 99 by passing the fabric 99 through the storage tank. The pre-processing liquid is liquid for fixing ink to the fabric 99 in the drawing processing. The pre-processing liquid affects hydrophilicity of the fabric 99 with respect to the ink.

The correction unit 15 is configured to correct the fabric 99. The correction unit 15 stretches warp yarns or weft yarns constituting the fabric 99 by applying force to the fabric 99, for example. This allows the fabric 99 to be corrected. The correction unit 15 includes, for example, a roller where the fabric 99 is wound, a pin, a clip, etc. that hold both sides of the fabric 99. The correction unit 15 is a so-called tenter. When the pre-processing liquid is applied to the fabric 99, shrinkage may occur in the fabric 99. As such, the correction unit 15 corrects the fabric 99 by stretching the fabric 99.

The pre-processing drying unit 16 is configured to dry the fabric 99. The pre-processing drying unit 16 is a drying unit included in the pre-processing device 11. The pre-processing drying unit 16 dries the fabric 99 to which the pre-processing liquid has been applied, for example, by heating the fabric 99. The pre-processing drying unit 16 includes a heater, for example.

The inkjet device 12 is a device that performs the drawing processing on the fabric 99. The drawing processing is a process for drawing an image on the fabric 99. The inkjet device 12 discharges the ink onto the fabric 99 to draw the image. The inkjet device 12 draws design images such as pictures, patterns, etc., for example. The inkjet device 12 includes, for example, a transport unit 17, a head 18, and a carriage 19.

The transport unit 17 is configured to transport the fabric 99. The transport unit 17 is, for example, a belt, a roller, etc. The transport unit 17 intermittently transports the fabric 99, for example.

The head 18 is configured to discharge the ink onto the fabric 99. The head 18 has a nozzle 21 for discharging the ink. A nozzle resolution of the head 18 is 600 dpi, for example. As such, the head 18 can draw the image with a resolution of 600 dpi on the fabric 99.

The head 18 is mounted in the carriage 19. The carriage 19 is configured to perform scanning on the fabric 99. The head 18 discharges the ink onto the fabric 99 while the carriage 19 performs scanning, thereby drawing or printing an image on the fabric 99. Thus, the inkjet device 12 is a so-called serial type printer.

The carriage 19 is configured to be mountable with a container 22 accommodating the ink, for example. The container 22 is an ink cartridge, for example. When the container 22 is attached to the carriage 19, the ink is supplied from the container 22 to the head 18. A code 23 for indicating the type of ink to be accommodated is attached to the container 22. The code 23 is, for example, a barcode.

The container 22 is not limited to being mounted in the carriage 19 and may be coupled to the head 18, for example, via a tube. The container 22 may be, for example, a container for refilling an accommodation container separately provided by the inkjet device 12, a so-called ink bottle.

The post-processing device 13 is a device that performs the post-processing on the fabric 99 after the image has been drawn. The post-processing is a process performed after the drawing processing. The post-processing device 13 includes, for example, a post-processing drying unit 24, a steam unit 25, and a cleaning unit 26.

The post-processing drying unit 24 is configured to dry the fabric 99. The post-processing drying unit 24 is a drying unit included in the post-processing device 13. The post-processing drying unit 24 dries the fabric 99 to which the ink has been discharged, for example, by heating the fabric 99. The post-processing drying unit 24 includes, for example, a heater. The post-processing drying unit 24 may be the same drying unit as the pre-processing drying unit 16. In other words, the pre-processing device 11 and the post-processing device 13 may share a drying unit.

The steam unit 25 is configured to supply hot steam to the fabric 99. As the steam unit 25 heats the fabric 99 with steam, the fixing of the ink discharged onto the fabric 99 is promoted.

The cleaning unit 26 is configured to clean the fabric 99. The cleaning unit 26 includes, for example, a cleaning tank that stores cleaning liquid. For example, the fabric 99 is cleaned by passing the fabric 99 through cleaning liquid. The cleaning liquid is, for example, water. When the fabric 99 is cleaned, ink, pre-processing liquid, etc. that are not fixed to the fabric 99 are removed from the fabric 99.

Figure 2:
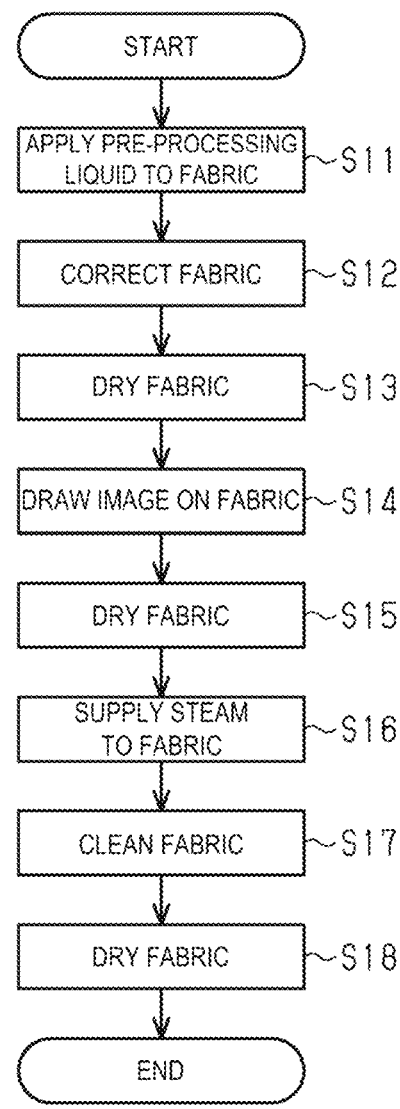
FIG. 2 is a flowchart illustrating a procedure of a printing process.

The printing system 10 performs the printing process, for example, along the flowchart illustrated in FIG. 2. The printing process is initiated by the user, for example.

As illustrated in FIG. 2, the printing system 10 first applies the pre-processing liquid to the fabric 99 by the application unit 14 in step S11.

The printing system 10 corrects the fabric 99 by the correction unit 15 in step S12.

The printing system 10 dries the fabric 99 by the pre-processing drying unit 16 in step S13.

The printing system 10 discharges the ink from the head 18 onto the fabric 99 transported by the transport unit 17 in step S14 to draw an image on the fabric 99. At this time, the carriage 19 is driven along with the head 18.

The printing system 10 dries the fabric 99 by the post-processing drying unit 24 in step S15. At this time, the printing system 10 dries the fabric 99 to an extent that migration of the ink discharged onto the fabric 99 is suppressed. That is, in step S15, the printing system 10 dries the fabric 99 to an extent that a front surface of the ink discharged onto the fabric 99 is dried.

The printing system 10 supplies steam to the fabric 99 by the steam unit 25 in step S16.

The printing system 10 cleans the fabric 99 with the cleaning unit 26 in step S17.

The printing system 10 dries the fabric 99 by the post-processing drying unit 24 in step S18. In step S18, unlike step S15, the printing system 10 completely dries the fabric 99. As a result, the fabric 99 wetted by the cleaning liquid is dried. Upon completion of the process of step S18, the printing process is complete.

In the printing system 10, the fabric 99 that has been subjected to the pre-processing may be treated and the fabric 99 that has been subjected to the drawing processing may be treated. When the fabric 99 that has been subjected to the pre-processing is treated, the printing system 10 starts the processing from step S14, for example, in the flowchart illustrated in FIG. 2. When the fabric 99 that has been subjected to the drawing processing is treated, the printing system 10 starts the processing from step S15 or step S16, for example, in the flowchart shown in FIG. 2.

Next, the information processing device 30 will be described.

As illustrated in FIG. 1, the information processing device 30 is electrically coupled to the printing system 10. For example, the information processing device 30 is electrically coupled to the pre-processing device 11, the inkjet device 12, and the post-processing device 13. As such, the information processing device 30 can exchange information with the pre-processing device 11, the inkjet device 12, and the post-processing device 13.

The information processing device 30 is a device for processing information related to the printing process. The information processing device 30 may also serve as a control device for controlling the printing system 10. In this case, the user controls the printing system 10 via the information processing device 30. The information processing device 30 controls a printing parameter related to the printing process of the printing system 10. The printing parameter includes, for example, a pre-processing parameter related to the pre-processing of the pre-processing device 11, a drawing processing parameter related to the drawing processing of the inkjet device 12, a post-processing parameter for the post-processing of the post-processing device 13, etc.

The pre-processing parameter includes, for example, an amount of the pre-processing liquid applied by the application unit 14, an application time of the pre-processing liquid by the application unit 14, a type of the pre-processing liquid, a direction of force applied by the correction unit 15 to the fabric 99, an amount of the force applied by the correction unit 15 to the fabric 99, a time the correction unit 15 applies the force to the fabric 99, a drying time of the pre-processing drying unit 16, a drying temperature of the pre-processing drying unit 16, etc.

The drawing processing parameter includes, for example, a transport speed of the fabric 99 by the transport unit 17, a distance between the head 18 and the fabric 99, a movement speed of the carriage 19, a number of passes of the carriage 19, a printing mode, a printing direction indicating unidirectional printing or bi-directional printing, etc.

The post-processing parameter includes, for example, a drying time of the post-processing drying unit 24, a drying temperature of the post-processing drying unit 24, a temperature of the steam supplied by the steam unit 25, a supply time of steam by the steam unit 25, a cleaning time by the cleaning unit 26, a temperature of the cleaning water, etc.

The information processing device 30 is, for example, a personal computer. The information processing device 30 may be configured as a circuit including a: one or more processors for performing various processes according to a computer program, (3: one or more dedicated hardware circuits such as application-specific integrated circuits that perform at least some processing of various processes, or y: combinations thereof. The processor includes a CPU and a memory such as a RAM and a ROM, and the memory stores a program code or an instruction configured to cause the CPU to execute a process. The memory, i.e. a computer-readable medium, includes any readable medium that can be accessed by a general-purpose or dedicated computer.

Figure 3:
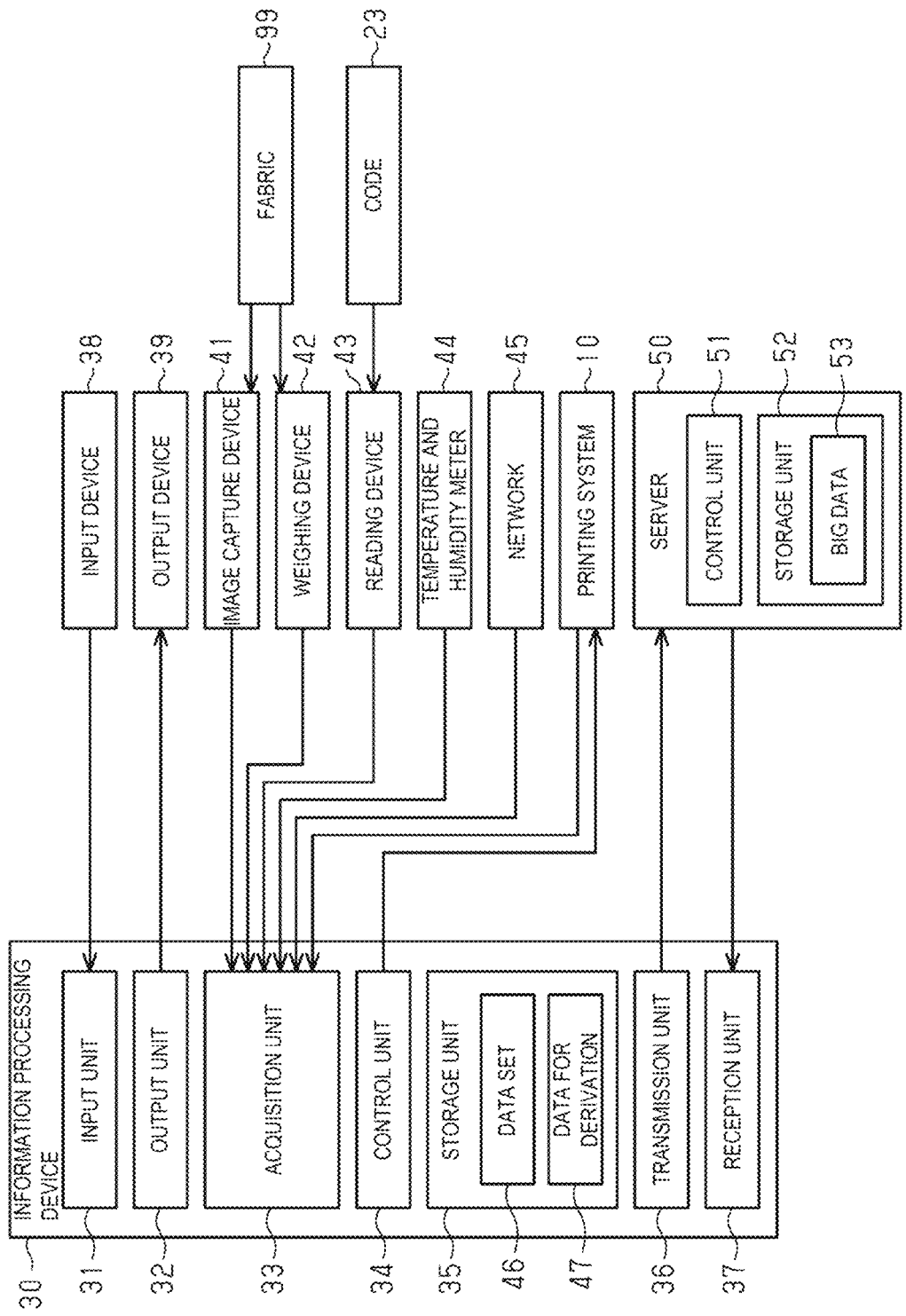
FIG. 3 is a block diagram illustrating one exemplary embodiment of an information processing device.

As illustrated in FIG. 3, the information processing device 30 includes, for example, an input unit 31, an output unit 32, an acquisition unit 33, a control unit 34, a storage unit 35, a transmission unit 36, and a reception unit 37.

The input unit 31 is an interface for the user to input data into the information processing device 30. Thus, the input unit 31 is coupled to an input device 38 such as a mouse, keyboard, or touch panel, for example. The user inputs data to the information processing device 30 through the input unit 31 by manipulating the input device 38. The data input through the input unit 31 is stored in the storage unit 35, for example.

The user inputs, for example, client data indicating information about a client through the input unit 31. The information about the client is, for example, a client country, a client name, etc. The user inputs application data indicating, for example, information related to the application of the fabric 99 to which the printing process has been performed through the input unit 31. The information related to the application is information representing an application such as, for example, female clothing, child clothing, interior, etc. The user may input other information to the information processing device 30 as data through the input unit 31, not limited to the client data and the application data.

The output unit 32 is an interface for outputting data from the information processing device 30. The output unit 32 is coupled to an output device 39 such as a display, a speaker, etc. For example, the user can grasp the data output from the information processing device 30 through the output unit 32 by ascertaining the output device 39.

The acquisition unit 33 is an interface for acquiring data from the outside. The acquisition unit 33 is coupled to, for example, an image capturing device 41, a weighing device 42, a reading device 43, a temperature and humidity meter 44, a network 45, the printing system 10, etc. In addition, the acquisition unit 33 may be coupled to a storage medium such as, for example, a USB flash drive, a memory card, etc. The acquisition unit 33 acquires data from the coupled object. The data acquired by the acquisition unit 33 is stored in the storage unit 35, for example.

The acquisition unit 33 acquires data indicating information related to the printing process, for example. When the printing system 10 performs the printing process, the acquisition unit 33 acquires, from the printing system 10, a printing parameter set to the pre-processing device 11, the inkjet device 12, and the post-processing device 13, for example.

The image capturing device 41 is a device that captures the fabric 99 as an image. The image capturing device 41 is, for example, a camera, a scanner, etc. The image capturing device 41 captures the fabric 99 as an image by capturing or scanning the fabric 99. At this time, the image capturing device 41 generates image data obtained by digitizing the fabric 99 as an image. Accordingly, the acquisition unit 33 acquires the image data obtained by digitizing the fabric 99 as an image through the image capturing device 41.

The user appropriately captures the fabric 99 as an image by using the image capturing device 41. For example, by the image capturing device 41, the user captures, as an image, the fabric 99 before the printing process is performed, the fabric 99 after the printing process is performed, the fabric 99 after the pre-processing is performed and before the drawing processing is performed, and the fabric 99 after the drawing processing is performed and before the post-processing is performed, etc. For example, the user captures the fabric 99 as an image at timings before the printing process is performed, after the printing process is performed, after the pre-processing is performed and before the drawing processing is performed, and after the drawing processing is performed and before the post-processing is performed. Thus, the image capturing device 41 generates pre-printing image data obtained by digitizing the fabric 99 before the printing process is performed as an image, post-printing image data obtained by digitizing the fabric 99 after the printing process is performed as an image, pre-drawing image data obtained by digitizing the fabric 99 after the pre-processing is performed and before the drawing processing is performed as an image, and post-drawing image data obtained by digitizing the fabric 99 before the post-processing is performed and after the drawing processing is performed as an image. Accordingly, the acquisition unit 33 can acquire the pre-printing image data, post-printing image data, pre-drawing image data, and post-drawing image data as image data obtained by digitizing the fabric 99 as an image.

The acquisition unit 33 of the present example acquires at least the pre-printing image data, the pre-drawing image data, and the post-drawing image data among the image data. When the printing system 10 is constituted by the pre-processing device 11 and the inkjet device 12, the acquisition unit 33 acquires at least the pre-printing image data and the pre-drawing image data among the image data. When the printing system 10 is constituted by the inkjet device 12 and the post-processing device 13, the acquisition unit 33 acquires at least the pre-printing image data and the post-drawing image data among the image data. In any case, the acquisition unit 33 may acquire the post-printing image data.

The image data is, for example, data obtained by digitizing a region of the fabric 99 having a length of 10 mm or greater and a width of 10 mm or greater at a resolution of 120 dpi or greater. With such a format, the image data suitable for image analysis described later can be obtained. As such, the image capturing device 41 digitizes a region of the fabric 99 having a length of 10 mm or greater and a width of 10 mm or greater at a resolution of 120 dpi or greater, and thereby captures the fabric 99 as an image. All of the pre-printing image data, pre-drawing image data, post-drawing image data, and post-printing image data may all be data with such a format, or any one may be data with such a format.

The image capturing device 41 captures the fabric 99 as a full color image. In other words, the image data is data indicating a color image. Without being limited to a full color image, the image capturing device 41 may capture the fabric 99 in a monochrome image, or in a greyscale image. All of the pre-printing image data, pre-drawing image data, post-drawing image data, and post-printing image data may all be data indicating a color image, or any one may be data indicating a color image.

The post-printing image data and the post-drawing image data among the image data may be data obtained by digitization at a resolution that is greater than or equal to the resolution of the image drawn on the fabric 99. In this case, the image data suitable for image analysis described later can be obtained.

The user may capture a front surface of the fabric 99 and a back surface of the fabric 99 as an image when capturing the fabric 99 as an image by the image capturing device 41. In this case, the image data includes the data obtained by digitizing the front surface of the fabric 99 and the data obtained by digitizing the back surface of the fabric 99. All of the pre-printing image data, pre-drawing image data, post-drawing image data, and post-printing image data may all be data including a front surface and a back surface, or any one may be data including a front surface and a back surface.

The user may capture an image in a state where the fabric 99 is stretched and an image in a state where the fabric 99 is not stretched when capturing the fabric 99 as an image by the image capturing device 41. In this case, the image data includes the data obtained by digitizing the fabric 99 in a state of being stretched and the data obtained by digitizing the fabric 99 in a state of being not stretched. For example, the user captures the fabric 99 as an image while stretching the fabric 99 by a hand thereof. The user may stretch the fabric 99 in a direction along the warp yarns, may stretch the fabric 99 along the weft yarns, or may stretch the fabric 99 diagonally relative to the warp yarns and weft yarns. All of the pre-printing image data, pre-drawing image data, post-drawing image data, and post-printing image data may all be data including a stretched state and an unstretched state, or any one may be data including a stretched state and an unstretched state.

The weighing device 42 is a device for weighing the fabric 99. The user measures a weight per unit area of the fabric 99 by using the weighing device 42. As a result, the acquisition unit 33 acquires basis weight data indicating the weight per unit area of the fabric 99 through the weighing device 42. The user weighs the fabric 99 at a timing before printing, before drawing, after drawing, and after printing, for example.

The reading device 43 is a device for reading the code 23 attached to the container 22, for example. The reading device 43 is, for example, a reader. The user causes the reading device 43 to read the code 23 attached to the container 22. The acquisition unit 33 acquires the corresponding ink data with the code 23 read by the reading device 43, for example, by referencing a database stored in the storage unit 35. The ink data is data indicating a type of ink such as, for example, reaction ink, dispersed ink, and acidic ink. The acquisition unit 33 acquires ink data indicating the type of ink accommodated in the container 22 by reading the code 23 attached to the container 22 by the reading device 43.

The temperature and humidity meter 44 is a sensor that measures temperature and humidity. The temperature and humidity meter 44 measures the temperature and humidity of an environment in which the pre-processing device 11, the inkjet device 12, and the post-processing device 13 are installed. As a result, the acquisition unit 33 acquires temperature and humidity data indicating the temperature and humidity of the environment in which the printing system 10 is installed.

The acquisition unit 33 may acquire data the through the network 45 based on the data input from the user. For example, based on data indicating a model number of the device input from the user, the acquisition unit 33 may acquire device data indicating information about the device from the database on the network 45. The information about the device includes information related to specifications, settings, etc. of the device. In other words, the acquisition unit 33 may acquire the device data indicating the device information of the pre-processing device 11. The acquisition unit 33 may acquire the device data indicating the device information of the inkjet device 12. The acquisition unit 33 may acquire the device data indicating the device information of the post-processing device 13.

The acquisition unit 33 acquires original image data, which is original data of the image drawn on the fabric 99 by the inkjet device 12, for example, from the storage medium, the network 45, etc. That is, the inkjet device 12 draws an image on the fabric 99 based on the original image data. The original image data can be the original data of the image drawn by the drawing processing. The original image data is, for example, data provided to the user from the client.

Without being limited to the image data, basis weight data, ink data, device data, printing parameter, original image data, the acquisition unit 33 may acquire other data. The acquisition unit 33 may acquire the data through the network 45 or may acquire the data through the input unit 31. The example described above is merely an example of the type of data acquired by the acquisition unit 33 and the means for acquiring the data. Accordingly, the acquisition unit 33 may acquire the data other than the type described above, or may acquire the data by a means other than the means described above.

The acquisition unit 33 may acquire status data indicating a usage condition of the pre-processing device 11, the inkjet device 12, and the post-processing device 13. The status data is data indicating the usage condition including environmental information of the pre-processing device 11, the inkjet device 12, and the post-processing device 13.

The status data is data indicating, for example, an operation time, which is the time elapsed since the pre-processing device 11, the inkjet device 12, and the post-processing device 13 have been in operation, the temperature and humidity of the environment in which the printing system 10 is installed, the water quality of the cleaning liquid used in the cleaning unit 26, etc. The status data includes the temperature and humidity data as data indicating the environmental information. The acquisition unit 33 acquires, as status data, for example, operating data indicating the operation time of each device from the printing system 10. The acquisition unit 33 acquires water quality data indicating the water quality of the cleaning liquid by, for example, inputting the water quality of the cleaning fluid through the input unit 31 as data indicating the environmental information.

The acquisition unit 33 may acquire altitude data indicating an altitude at which the pre-processing device 11, the inkjet device 12, and the post-processing device 13 are installed as data indicating the environmental information. The acquisition unit 33 acquires the altitude data by, for example, inputting the altitude at which the pre-processing device 11, the inkjet device 12, and the post-processing device 13 are installed, through the input unit 31. The acquisition unit 33 may acquire the altitude data from the network 45, or may acquire the altitude data by performing conversion from a barometer coupled to the acquisition unit 33.

The control unit 34 is, for example, the CPU described above. The control unit 34 comprehensively controls the information processing device 30. The control unit 34 controls various configurations by executing a program stored in the storage unit 35. The control unit 34 may control the printing system 10, for example. The control unit 34 controls the printing system 10, for example, by transmitting the printing parameter to the printing system 10.

The storage unit 35 is, for example, the memory described above. In addition to the program executed by the control unit 34, the storage unit 35 stores, for example, data input through the input unit 31, data output through the output unit 32, data acquired by the acquisition unit 33, etc. The storage unit 35 stores a data set 46 and derivation data 47, for example.

The storage unit 35 stores one or more data sets 46. The data set 46 is a set of a plurality of data for one printing process. The data set 46 includes data input through the input unit 31, data acquired through the acquisition unit 33, etc. In other words, the storage unit 35 stores data input through the input unit 31, data acquired by the acquisition unit 33, etc. as the data set 46. The data set 46 includes at least the pre-printing image data and the ink data. The storage unit 35 stores the data set 46 illustrated in Table 1, for example.

TABLE 1

| | Original image data | Printing parameter | Pre-printing image data | Pre-drawing image data | Post-drawing image data | Post-printing image data |
|---|---|---|---|---|---|---|
| First data set | ... | ... | ... | ... | ... | ... |
| Second data set | ... | ... | ... | ... | ... | ... |
| Third data set | ... | ... | ... | ... | ... | ... |
| Fourth data set | ... | ... | ... | ... | ... | ... |
| ... | ... | ... | ... | ... | ... | ... |

As illustrated in Table 1, the data set 46 is associated with a plurality of data such as the original image data, printing parameter, pre-printing image data, pre-drawing image data, post-drawing image data, post-printing image data, etc. Table 1 lists the original image data, printing parameter, pre-printing image data, pre-drawing image data, post-drawing image data, and post-printing image data, but actually, the data input through the input unit 31 and other data acquired by the acquisition unit 33, such as the client data, ink data, and application data described above, are also associated with the data. The data set 46 is a set of various data and various parameters associated with one printing process.

The derivation data 47 is data indicating a correspondence relationship between the pre-printing image data, the pre-drawing image data or the post-drawing image data, and the recommended parameter for at least one of the pre-processing device 11 and the post-processing device 13. The derivation data 47 indicates, for example, a correspondence relationship between the pre-printing image data and the recommended parameter, a correspondence relationship between the pre-drawing image data and the recommended parameter, and a correspondence relationship between the post-drawing image data and the recommended parameter. The derivation data 47 is data for deriving the recommended parameter based on the pre-printing image data, the pre-drawing image data, or the post-drawing image data.

The derivation data 47 may indicate the correspondence relationship between the pre-printing image data, the pre-drawing image data or the post-drawing image data, and the recommended parameter for the inkjet device 12. The derivation data 47 may indicate, for example, the correspondence relationship between the pre-printing image data, the pre-drawing image data or the post-drawing image data, and the recommended parameter for the inkjet device 12, in addition to the correspondence relationship between the pre-printing image data, the pre-drawing image data or the post-drawing image data, and the recommended parameter for at least one of the pre-processing device 11 and the post-processing device 13.

The recommended parameter is a printing parameter recommended for obtaining predetermined image quality. The recommended parameter may be, for example, a printing parameter recommended for obtaining the image quality equivalent to the original image data, or a printing parameter recommended for obtaining image quality such that the client evaluates that the image quality is sufficient.

The derivation data 47 is data defining a learned model learned by machine learning. The derivation data 47 is generated, for example, by inputting the data set 46 described above into a model for machine learning and by causing the model to learn the data set 46. Such a learned model can be generated, for example, by a server 50 calculating based on the data set 46.

The transmission unit 36 is an interface for transmitting data to the server 50. For example, transmission unit 36 transmits the data set 46 to the server 50.

The reception unit 37 is an interface for receiving data from the server 50. For example, the reception unit 37 receives the derivation data 47 from the server 50.

Figure 4:
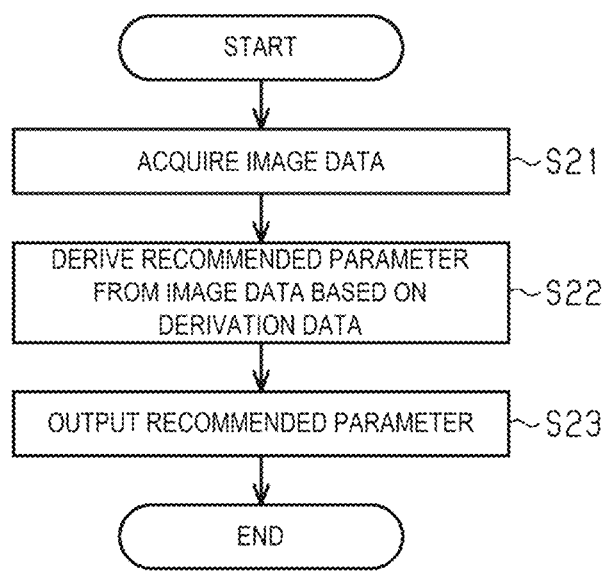
FIG. 4 is a flowchart illustrating operation of the information processing device.

The information processing device 30 performs operation along a flowchart illustrated in FIG. 4, for example. The series of processes illustrated in FIG. 4 is initiated by the user, for example. The series of processes illustrated in FIG. 4 is executed by the control unit 34.

As illustrated in FIG. 4, first, in step S21, the control unit 34 acquires the image data by the acquisition unit 33. At this time, the control unit 34 acquires image data obtained by digitizing the fabric 99 as an image at the time when the printing system 10 starts processing on the fabric 99. For example, step S21 is performed before the process is performed by the printing system 10.

When the printing system 10 treats the fabric 99 without the pre-processing and the drawing processing, the control unit 34 acquires the pre-printing image data by the acquisition unit 33. When the printing system 10 treats the fabric 99 that has been subjected to the pre-processing, the control unit 34 acquires the pre-drawing image data by the acquisition unit 33. When the printing system 10 treats the fabric 99 that has been subjected to the drawing processing, the control unit 34 acquires the post-drawing image data by the acquisition unit 33. After acquiring the image data, the control unit 34 may store the image data in the storage unit 35. Without being limited to acquiring image data from an external device such as the input device 38, the image capturing device 41, etc. through the acquisition unit 33, for example, the control unit 34 may acquire the image data from the data set 46 stored in the storage unit 35.

In step S22, the control unit 34 derives the recommended parameter from the image data based on the derivation data 47. Specifically, the control unit 34 inputs the image data acquired in step S21 into the learned model defined by the derivation data 47. In a case where the pre-printing image data is acquired in step S21, the control unit 34 inputs the pre-printing image data into the learning model. In this case, the recommended parameter is derived from the pre-printing image data. In a case where the pre-drawing image data is acquired in step S21, the control unit 34 inputs the pre-drawing image data into the learning model. In this case, the recommended parameter is derived from the pre-drawing image data. In a case where the post-drawing image data is acquired in step S21, the control unit 34 inputs the post-drawing image data into the learned model. In this case, the recommended parameter is derived from the post-printing image data.

The control unit 34 derives the recommended parameter of the pre-processing device 11, the inkjet device 12, and the post-processing device 13, for example, when the pre-printing image data is input to the learned model. The control unit 34 derives the recommended parameter of the inkjet device 12 and the post-processing device 13, for example, when the pre-drawing image data is input to the learned model. The control unit 34 derives the recommended parameter of the post-processing device 13, for example, when the post-drawing image data is input to the learned model.

In step S23, the control unit 34 outputs the recommended parameter through the output unit 32. When the recommended parameter is output through the output unit 32, the user can grasp the recommended parameter recommended for obtaining predetermined image quality. This allows the user to take advantage of the recommended parameter output as an indicator to obtain the predetermined image quality. The control unit 34 may automatically reflect the derived recommended parameter to the corresponding device.

Upon terminating the process in step S23, the control unit 34 terminates the series of processes illustrated in FIG. 4. As described above, the information processing method for processing information related to the printing process includes acquiring the pre-printing image data and at least one of the pre-drawing image data and the post-drawing image data, and deriving the recommended parameter from the pre-printing image data, the pre-drawing image data, or the post-drawing image data based on the derivation data 47. The information processing method is implemented, for example, by causing a computer to execute a program. This program may be stored in the storage unit 35, or may be stored in the storage medium. The control unit 34 executes the information processing described above by reading the program.

Next, the server 50 will be described.

As illustrated in FIG. 3, the server 50 is electrically coupled to the information processing device 30. Similar to the information processing device 30, the server 50 may be configured as a circuit including a: one or more processors for performing various processes according to a computer program, (3: one or more dedicated hardware circuits such as application-specific integrated circuits that perform at least some processing of various processes, or y: combinations thereof. The processor includes a CPU and a memory such as a RAM and a ROM, and the memory stores a program code or an instruction configured to cause the CPU to execute a process. The memory, i.e. a computer-readable medium, includes any readable medium that can be accessed by a general-purpose or dedicated computer.

The server 50 includes the control unit 51 and the storage unit 52. The control unit 51 is, for example, the CPU described above. The storage unit 52 is, for example, the memory described above.

Upon receiving the data from the information processing device 30, the control unit 51 causes the data to be stored in the storage unit 52. For example, upon receiving the data set 46 from the information processing device 30, the control unit 51 causes the data set 46 to be stored in the storage unit 52. In this manner, the control unit 51 accumulates the received data in the storage unit 52. By accumulating data in the storage unit 52, so-called big data 53 is configured.

Figure 5:
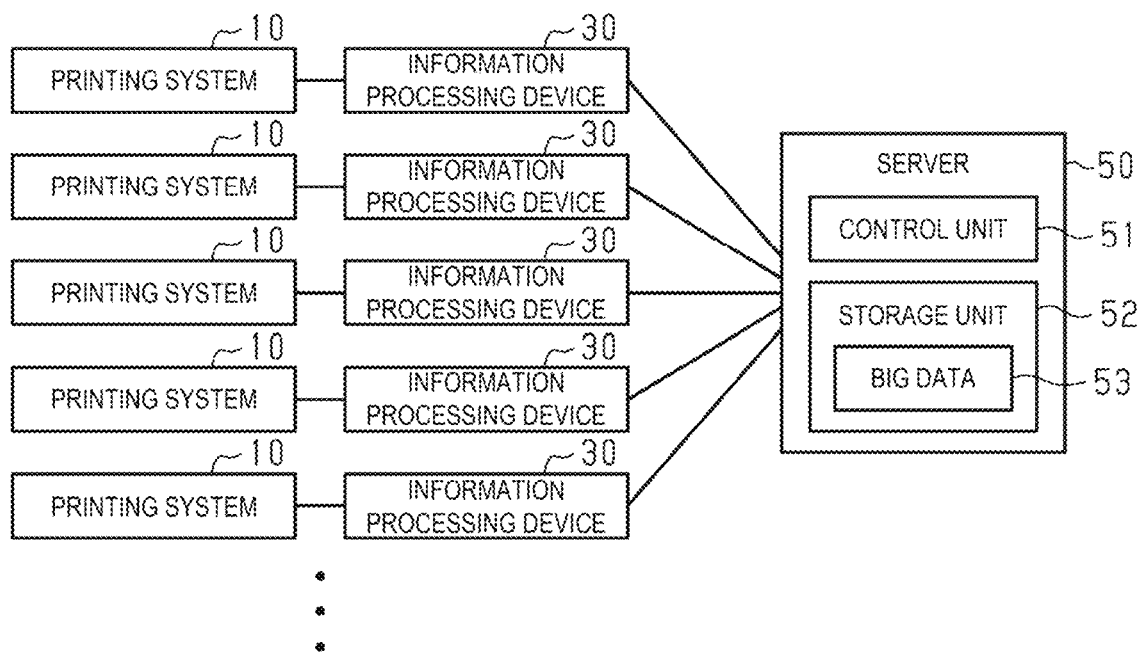
FIG. 5 is a block diagram illustrating a server.

As illustrated in FIG. 5, the server 50 is electrically coupled to a plurality of the information processing devices 30. Thus, the control unit 51 receives the various data transmitted from a plurality of the printing systems 10. The control unit 51 stores data transmitted from the plurality of information processing devices 30 in the storage unit 52.

Thus, the server 50 collects data for the printing process at different conditions and different environments for each printing system 10. For example, the server 50 collects the image data of the fabric 99 processed in different conditions and different environments.

Upon receiving the image data transmitted from the information processing device 30, the control unit 51 performs image analysis on the image data. Upon receiving the pre-printing image data, the pre-drawing image data, the post-drawing image data, or the post-printing image data, the control unit 51 performs the image analysis on the received image data. The control unit 51 performs operation along a flowchart illustrated in FIG. 6, for example, when the image data is received.

Figure 6:
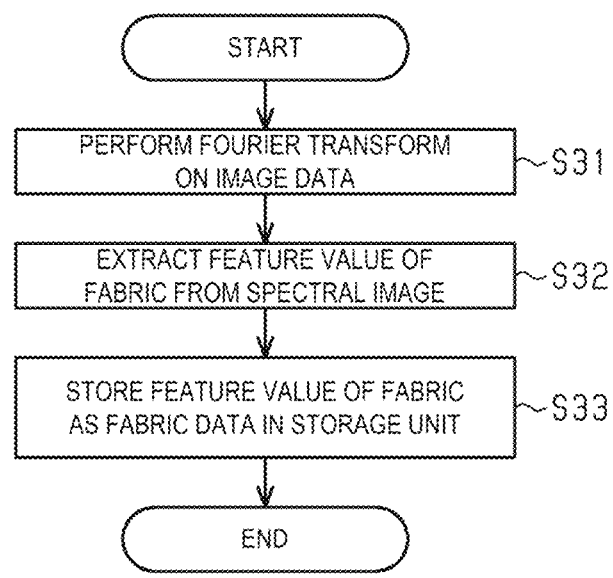
FIG. 6 is a flowchart illustrating operation of the server.

As illustrated in FIG. 6, the control unit 51 performs a Fourier transform on the image data in step S31. The control unit 51 analyzes the image data by the Fast Fourier Transform, for example. When the image data is in a full color, the control unit 51 performs the Fast Fourier Transform on primary colors, for example. The control unit 51 performs the Fourier transform on two directions in a vertical direction and a horizontal direction with the luminance as an amplitude. Thus, a spectral image is obtained for the image data.

In step S32, the control unit 51 extracts the feature value of the fabric 99 from the spectral image. At this time, the thickness, density, and surface roughness, etc. of the yarns constituting the fabric 99 are extracted. The hydrophilicity of the fabric 99 is determined by the thickness, density, surface roughness, etc. of the yarns constituting the fabric 99. The hydrophilicity of the fabric 99 is also the feature value of the fabric 99. In other words, by performing the image analysis of the image data, the hydrophilicity of the fabric 99 is extracted as an example of the feature value of the fabric 99. The hydrophilicity of the fabric 99 greatly affects the image quality of the image drawn on the fabric 99. Therefore, an appropriate printing process can be performed by grasping the feature value of the fabric 99.

The hydrophilicity of the fabric 99 varies by performing the pre-processing, drawing, or post-processing on the fabric 99. By analyzing the image after printing, before printing, before drawing, and after drawing, the feature value of the fabric 99 that varies for each processing can be grasped.

Figure 7:
FIG. 7 is a diagram illustrating a pre-printing image and a spectral image.
Figure 7:
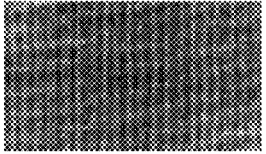
Figure 7:
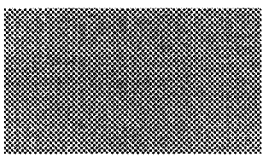
Figure 7:
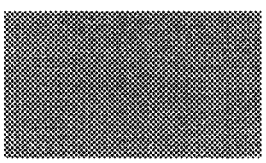
Figure 7:
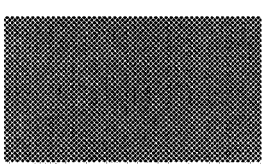
Figure 7:
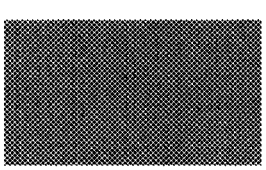
Figure 7:
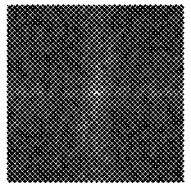
Figure 7:
Figure 7:
Figure 7:
Figure 7:
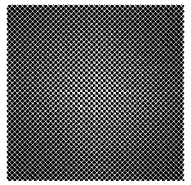
Figure 7:

As illustrated in FIG. 7, when extracting the feature value of the fabric 99 from the image data, there is a resolution of the image data suitable for the image analysis. The image illustrated in FIG. 7 is a pre-printing image. FIG. 7 illustrates six patterns of the resolution, definition, image and spectral image. The pre-printing images of the six patterns illustrated in FIG. 7 are displayed at the different resolution and definition.

The resolution illustrated in FIG. 7 is the resolution of the pre-printing image illustrated in FIG. 7, that is, the resolution when the fabric 99 is digitized as an image. The definition illustrated in FIG. 7 is the definition of the pre-printing image illustrated in FIG. 7, that is, the definition when the fabric 99 is digitized as an image. The pre-printing image illustrated in FIG. 7 is an image of the fabric 99 having a yarn thickness of approximately 500 μm. The spectral image illustrated in FIG. 7 is an image obtained by performing the Fourier transform on the pre-printing image located directly above the spectral image.

Turning to FIG. 7, it can be seen that a sharp spectral image can be obtained when the resolution of the pre-printing image is 120 dpi or greater. With the pre-printing images having the resolution of less than 120 dpi, for example, 60 dpi, 24 dpi in resolution, the images become rough, whereby making it difficult to extract the feature value of the fabric 99.

As described above, the region of the pre-printing image data is, for example, greater than or equal to 10 mm and greater than or equal to 10 mm. This is because when the yarn thickness is 500 µm, the yarn can be displayed at a pitch of 20. This makes it easier to extract the feature value of the fabric 99.

As illustrated in FIG. 6, in step S33, the control unit 51 stores the feature value of the fabric 99 as fabric data in the storage unit 52. At this time, the control unit 51 stores the fabric data in the storage unit 52 after associating it with the analyzed image data. As such, the fabric data constitutes the big data 53. The fabric data includes data indicating the feature value of the fabric 99 obtained by digitization as a pre-printing image, data indicating the feature value of the fabric 99 obtained by digitization as a pre-drawing image, data indicating the feature value of the fabric 99 obtained by digitization as a post-drawing image, and data indicating the feature value of the fabric 99 obtained by digitization as a post-printing image. The fabric data is individually stored in the storage unit 52 as fabric data of the pre-printing image, fabric data of the pre-drawing image, fabric data of the post-drawing image, and fabric data of the post-printing image.

Upon terminating the process in step S33, the control unit 51 terminates the series of processes illustrated in FIG. 6. In a case where the received image data is the post-drawing image data or the post-printing image data, the control unit 51 quantifies the image quality by analyzing the image data. In this case, the control unit 51 quantifies the image quality by the Fast Fourier Transform, for example. When the image data is in a full color, the control unit 51 performs the Fast Fourier Transform on primary colors, for example.

The post-drawing image data and the post-printing image data is data obtained by digitization at a resolution that is greater than or equal to the resolution of the image drawn on the fabric 99. In other words, deterioration of the image quality is suppressed when capturing the fabric 99 as an image for the post-drawing image data and the post-printing image data. Therefore, the image quality of the post-drawing image data and the post-printing image data can be appropriately quantified. When the post-drawing image data and the post-printing image data includes data in a stretched state of the fabric 99, the data can be quantified, including image quality of the image in the stretched state.

Figure 8:
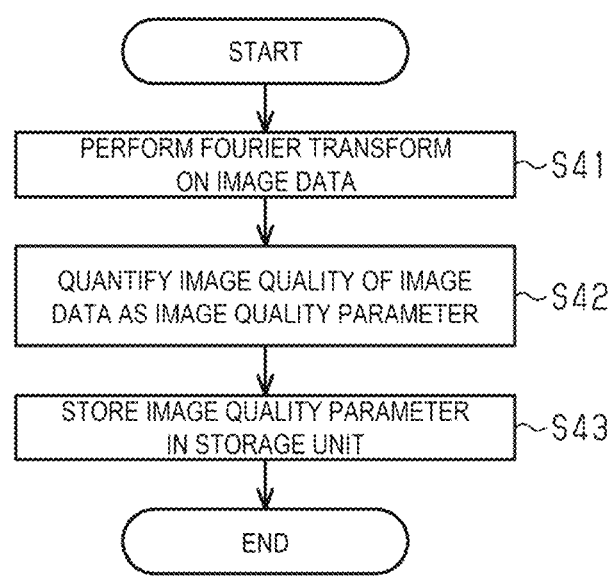
FIG. 8 is a flowchart illustrating operation different from that of FIG. 6.

The control unit 51 performs operation along a flowchart illustrated in FIG. 8, for example, when the post-drawing image data and the post-printing image data are received. The series of processes illustrated in FIG. 8 may be performed in parallel with the series of processes illustrated in FIG. 6.

As illustrated in FIG. 8, the control unit 51 performs the Fourier transform on the image data in step S41. At this time, the control unit 51 performs the Fourier transform on two directions in a vertical direction and a horizontal direction with the luminance as an amplitude. As a result, a spectrum such as example, a power spectrum, a Wiener spectrum, etc. are obtained for the image data.

In step S42, the control unit 51 quantifies the image quality of the image data as an image quality parameter by analyzing the spectrum. Examples of the image quality include black concentration, gamut, strikethrough, bleeding, sharpness, color taste, granularity, banding, gradation, etc. An indicator value indicating such image quality is correlated with the spectrum obtained in step S42. For example, when banding occurs, an indicator value indicating the banding is represented in the spectrum. For example, as for granularity, an indicator value indicating the granularity is represented in the spectrum.

The control unit 51 determines the indicator value to be an indicator of the banding based on, for example, the power spectrum of the image data and a predetermined correction function that corrects the visual sensitivity. The control unit 51 determines the indicator value to be an indicator of granularity based on, for example, a predetermined correction function for correcting the luminous sensitivity and the Wiener spectrum of the analysis image data. The control unit 51 evaluates the banding and granularity, for example, by comparing the obtained indicator value with a reference value thereof. In this manner, the control unit 51 quantifies the image quality of the image data as an image quality parameter. As a result, the image quality of the image data is evaluated by an objective indicator.

In step S43, the control unit 51 stores the image quality parameter in the storage unit 52. Specifically, the control unit 51 stores the image quality parameter obtained in step S42 in association with the image data analyzed and stores the image quality parameter in the storage unit 52. In other words, the control unit 51 accumulates the image quality of the image data in a state of being quantified as an image quality parameter in the storage unit 52. As such, the image quality parameter constitutes the big data 53. The image quality parameter includes a parameter indicating the image quality of the post-drawing image data, and a parameter indicating the image quality of the post-printing image data. The image quality parameter is stored individually in the storage unit 52 as an image quality parameter of the post-drawing image and an image quality parameter of the post-printing image.

Upon terminating the process in step S43, the control unit 51 terminates the series of processes illustrated in FIG. 8. In a case where the control unit 51 receives the original image data in addition to the image data of the post-drawing image data and the post-printing image data, the control unit 51 can quantify the image quality of the image data with regard to the original image data. In this case, the control unit 51 first generates analysis image data from the image data and the original image data. The control unit 51 generates the analysis image data by, for example, taking a luminance difference between the image data and the original image data for each corresponding pixel. This results in the analysis image data that does not affect an image design. In other words, the image quality of the post-drawing image data and the image quality of the post-printing image data can be evaluated without affecting the image design.

The analysis image data indicates a change in the image quality between the image data and the original image data. That is, the analysis image data represents the image quality of the image data based on the original image data. Therefore, by analyzing the analysis image data, it is possible to evaluate how much the image quality of the image data has changed relative to the original image data. That is, the degree of the deterioration of the image quality can be evaluated. The control unit 51 accumulates the image quality of the image data after quantifying the image quality by performing the series of processes illustrated in FIG. 8 on the analysis image data.

Next, the generation of the derivation data 47 by the server 50 will be described. The server 50 may transmit the generated derivation data 47 to the information processing device 30. In this case, the derivation data 47 stored in the storage unit 35 of the information processing device 30 can be updated.

The control unit 51 may generate the derivation data 47 defining a learned model from the big data 53 stored in the storage 52.

For example, the control unit 51 inputs the large amount of data accumulated in the storage unit 52 as supervised data into the model. As supervised data, for example, the image data, the fabric data, the printing parameter and the image quality parameter are used. The fabric data includes fabric data for each image data. The image quality parameter includes an image quality parameter for each image data. The control unit 51 may use the original image data as supervised data or may use the data set 46 as supervised data. Examples of learning techniques include, for example, deep learning.

Based on the supervised data, the model learns the correlation between the fabric data, the printing parameter, and the image quality parameter. As a result, the relationship between the image data and the printing parameter recommended for obtaining predetermined image quality is found. In particular, the relationship between the condition of the fabric 99 where the printing system 10 starts the process and the processing conditions by the printing system 10 recommended for finally obtaining the predetermined image quality, is found. Such learning results in a learned model that outputs the printing parameter recommended for obtaining predetermined image quality when the pre-printing image data, the pre-drawing image data or the post-drawing image data is input, Based on the supervised data, for each process, the correlation between the condition of the processing and a status change of the fabric 99 due to processing can also be learned in the model. The status change of the fabric 99 includes a feature value change of the fabric 99, and an image quality change of the image drawn on the 99 fabric. For example, the correlation between the pre-processing parameter and the status change of the fabric 99 due to the pre-processing can be grasped from the pre-processing parameter included in the printing parameter, the fabric data of the pre-printing image data, and the fabric data of the pre-drawing image data. The correlation between the drawing parameter and the status change of the fabric 99 due to the drawing can be grasped from the drawing parameter included in the printing parameter, the fabric data of the pre-drawing image data, and the fabric data and the image quality parameter of the post-drawing image data. The correlation between the post-processing parameter and the status change of the fabric 99 due to the post-processing can be grasped from the post-processing parameter included in the printing parameter, the fabric data and the image quality parameter of the post-drawing image data, and the fabric data and the image quality parameter of the post-printing image data.

The derivation data 47 may be constituted by a plurality of neural networks. The derivation data 47 may include, for example, first data, second data, and third data. The first data is, for example, data defining a learned model that outputs the recommended parameter for the pre-processing device 11, the inkjet device 12, and the post-processing device 13 when the pre-printing image data is input. The second data is, for example, data defining a learned model that outputs the recommended parameter for the inkjet device 12 and the post-processing device 13 when the pre-drawing image data is input. The third data is, for example, data defining a learned model that outputs the recommended parameter for the post-processing device 13 when the post-drawing image data is input.

The control unit 51 changes data used for learning from the big data 53, depending on the purpose of the learned model. In other words, the control unit 51 changes the data used for learning in accordance with input variables input to the learned model and output variables output by the learned model. For example, the control unit 51 may use the device data for learning. In this case, the derivation data 47 indicates the correspondence relationship between the pre-printing image data, the pre-drawing image data or the post-drawing image data, and device data, and the recommended parameter. The control unit 51 derives, based on the derivation data 47, the recommended parameter from the pre-printing image data, the pre-drawing image data, or the post-drawing image data, and the device data.

The data used for learning of the big data 53 is optional. Accordingly, various learned models can be generated from the big data 53. The control unit 51 may generate a learned model that outputs the printing parameter recommended for obtaining the image quality equivalent to the original image data, and may generate a learned model that outputs the printing parameter recommended for keeping the change in the image quality with respect to the original image data within a predetermined value.

The control unit 51 can verify the accuracy of the derivation data 47. The control unit 51 verifies the accuracy of the derivation data 47 based on, for example, the post-printing image data transmitted from the information processing device 30.

In a case where the first data is verified, after obtaining the fabric data and the image quality parameter from the post-printing image data, the control unit 51 compares the fabric data and the image quality parameter with the fabric data and the image quality parameter to be obtained by the recommended parameter output from the first data. In other words, the control unit 51 compares the fabric data and the image quality parameter as theoretical values obtained from the first data with the fabric data and the image quality parameter as actual measurement values obtained by actually performing the pre-processing, the drawing processing, and the post-processing.

In a case where the second data is verified, after obtaining the fabric data and the image quality parameter from the post-printing image data, the control unit 51 compares the fabric data and the image quality parameter with the fabric data and the image quality parameter to be obtained by the recommended parameter output from the second data. In other words, the control unit 51 compares the fabric data and the image quality parameter as theoretical values obtained from the second data with the fabric data and the image quality parameter as actual measurement values obtained by actually performing the drawing processing, and the post-processing.

In a case where the third data is verified, after obtaining the fabric data and the image quality parameter from the post-printing image data, the control unit 51 compares the fabric data and the image quality parameter with the fabric data and the image quality parameter to be obtained by the recommended parameter output from the third data. In other words, the control unit 51 compares the fabric data and the image quality parameter as theoretical values obtained from the third data with the fabric data and the image quality parameter as actual measurement values obtained by actually performing the post-processing.

When the deviation between the theoretical value and the actual measurement value is greater than or equal to the predetermined value, the accuracy of the model defined by the data can be estimated to be low. In this case, the control unit 51 updates the derivation data 47 by, for example, relearning the learned model.

By leveraging the big data 53, the control unit 51 can estimate whether or not the pre-processing parameter set to the pre-processing device 11, the drawing processing parameter set to the inkjet device 12, and the post-processing parameter set to the post-processing device 13 are appropriate for obtaining the predetermined image quality.

For example, the control unit 51 compares the fabric data of the pre-drawing image data as a theoretical value estimated from the pre-printing image data and the pre-processing parameters, with the fabric data of the pre-drawing image data as an actual measurement value obtained by performing the pre-processing. For example, the control unit 51 compares the fabric data and the image quality parameter of the post-drawing image data as theoretical values estimated from the pre-drawing image data and the drawing processing parameter, with the fabric data and the image quality parameter of the post-drawing image data as actual measurement values obtained by performing the drawing processing. For example, the control unit 51 compares the fabric data and the image quality parameter of the post-printing image data as theoretical values estimated from the post-drawing image data and the post-processing parameter, with the fabric data and the image quality parameter for the post-printing image data as actual measurement values obtained by performing the post-processing. When the deviation between the theoretical value and the actual measurement value is greater than or equal to the predetermined value, it can be estimated that the set printing parameter is not appropriate.

Next, the functions and effects of the information processing device 30 will be described.

(1) The information processing device 30 includes the acquisition unit 33 configured to acquire the pre-printing image data and at least one of the pre-drawing image data and the post-drawing image data, the storage unit 35 configured to store the derivation data 47 indicating the correspondence relationship between the pre-printing image data, the pre-drawing image data or the post-drawing image data, and the recommended parameter for at least one of the pre-processing device 11 and the post-processing device 13, and the control unit 34 configured to derive the recommended parameter from the pre-printing image data, the pre-drawing image data, or the post-drawing image data based on the derivation data 47.

According to this configuration, the control unit 34 can provide the user with the recommended parameter for at least one of the pre-processing device 11 and the post-processing device 13 based on the pre-printing image data, the pre-drawing image data, or the post-drawing image data by the derivation data 47. The user may obtain predetermined image quality by setting, to the device, the recommended parameter. This makes the user's work easier. Further, even when the fabric 99 has been subjected to the pre-processing or drawing processing, the recommended parameter can be provided, which simplifies the user's work.

(2) The pre-printing image data, the pre-drawing image data, and the post-drawing image data are data obtained by digitizing a region of the fabric having a length of 10 mm or greater and a width of 10 mm or greater at a resolution of 120 dpi or greater.

According to this configuration, the image data suitable for obtaining the recommended parameter can be obtained. In particular, the image data suitable for obtaining spectral images from image data can be obtained.

(3) The post-drawing image data includes the data obtained by digitizing the front surface of the fabric 99 and the data obtained by digitizing the back surface of the fabric 99.

For example, the absence of ink strikethrough is important in the image quality. Therefore, according to this configuration, the image data suitable for obtaining the recommended parameter can be obtained. In other words, the accurate image analysis can be performed by the server 50 in order to confirm the strikethrough of the ink discharged to the fabric 99.

(4) The post-drawing image data includes the data obtained by digitizing the fabric 99 in a state of being stretched and the data obtained by digitizing the fabric 99 in a state of being not stretched.

For example, it is important in the image quality that the strikethrough of the ink does not occur in a state where the fabric 99 is stretched. Therefore, according to this configuration, the image data suitable for obtaining the recommended parameter can be obtained. In other words, the image analysis with accuracy can be performed by the server 50 in order to confirm the picture in a state where the fabric 99 is stretched.

(5) The pre-printing image data, the pre-drawing image data, and the post-drawing image data are data configured to indicate a color image.

According to this configuration, information indicating color is included in the image data, so the image data suitable for obtaining the recommended parameter can be obtained.

(6) The acquisition unit 33 is configured to acquire at least one of the device data indicating the device information of the pre-processing device 11 and the device data indicating the device information of the post-processing device 13. The derivation data 47 indicates the correspondence relationship between the pre-printing image data, the pre-drawing image data or the post-drawing image data, and device data, and the recommended parameter. The control unit 34 derives, based on the derivation data 47, the recommended parameter from the pre-printing image data, the pre-drawing image data, or the post-drawing image data, and the device data.

According to this configuration, the control unit 34 can provide the user with the recommended parameter for at least one of the pre-processing device 11 and the post-processing device 13 based on the pre-printing image data, the pre-drawing image data, or the post-drawing image data, and the device data.

The present exemplary embodiment described above may be modified as follows. The present exemplary embodiment and the modified examples below may be implemented in combination within a range in which a technical contradiction does not arise.

The first data, the second data, and the third data constituting the derivation data 47 may be data defining an analysis model obtained by multivariate analysis. The first data is, for example, data defining an analysis model for deriving the recommended parameter from the pre-printing image data. The second data is, for example, data defining an analysis model for deriving the recommended parameter from the pre-drawing image data. The third data is, for example, data defining an analysis model for deriving the recommended parameter from the post-drawing image data.

In order to obtain the analysis model, the control unit 51 performs the multivariate analysis on a large amount of the data accumulated in the storage unit 52. The control unit 51 performs the multivariate analysis on, for example, the fabric data, the image quality parameter and the printing parameter. The control unit 51 may perform the multivariate analysis on the data set 46. One example of the multivariate analysis includes an MT method.

First, from the large amount of data, a population, i.e., unit space, is created in which the image quality of the post-printing image data is greater than or equal to predetermined image quality. Then, the Mahalanobis distance to the unit space is calculated. As a result, the correlation between the image quality parameter of the post-printing image and other data can be gasped. The greater the Mahalanobis distance, the lower the image quality. Next, the threshold value of the Mahalanobis distance with respect to the unit space is determined. As a result, an analysis model defining the first data, an analysis model defining the second data, and an analysis model defining the third data can be obtained. According to these analytical models, the relationship is found between the fabric data of the pre-printing image, the fabric data and image quality parameter of the pre-drawing image, the fabric data and image quality parameter of the post-drawing image, and the printing parameter recommended for obtaining the desired image quality, that is, the recommended parameter. The fabric data and the image quality parameter are obtained from the image data. Therefore, it can be said that an analysis model is obtained that derives the recommended parameter from the pre-printing image data, the pre-drawing image data, or the post-drawing image data. In this case, the server 50 may transmit, to the information processing device 30, the analysis result of the pre-printing image data, the analysis result of the pre-drawing image data, or the analysis result of the post-drawing image data. In this manner, the information processing device 30 can derive the recommended parameter from the image data based on the derivation data 47.

- A program causing a computer to process information about the printing process may be distributed and sold, e.g., in a stored state in a storage medium, or distributed and sold over a communication line.
- In addition to the information processing device 30, a control device for controlling the printing system 10 may be provided. In this case, the user controls the printing system 10 through the control device based on the information provided by the information processing device 30.
- The data set 46 may include evaluation data indicating information regarding the evaluation of the client relative to the image quality of the post-printing image. By generating the derivation data 47 from the data set 46 including the evaluation data, the client's criteria for the image quality can be grasped.
- The image capturing device 41 may be incorporated into the printing system 10. For example, the image capturing device 41 may be controlled by the information processing device 30.

Hereinafter, technical concepts and effects thereof that are understood from the above-described exemplary embodiments and modified examples will be described.

(A) The information processing device includes an information processing device configured to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the information processing device including an acquisition unit configured to acquire pre-printing image data and at least one of pre-drawing image data and post-drawing image data, the pre-printing image data being obtained by digitizing, as an image, the fabric before the printing process is performed, the pre-drawing image data being obtained by digitizing, as an image, the fabric after the pre-processing is performed and before the image is drawn, the post-drawing image data being obtained by digitizing, as an image, the fabric before the post-processing is performed and after the image is drawn, a storage unit configured to store derivation data configured to indicate a correspondence relationship between the pre-printing image data, the pre-drawing image data or the post-drawing image data, and a recommended parameter for at least one of the pre-processing device and the post-processing device, and a control unit configured to derive, based on the derivation data, the recommended parameter from the pre-printing image data, the pre-drawing image data or the post-drawing image data.

The yarns constituting the fabric are represented in the pre-printing image, the pre-drawing image, and the post-drawing image. Therefore, the pre-printing image data, the pre-drawing image data, and the post-drawing image data include information indicating the feature value of the fabric, such as the thickness and density of the yarns constituting the fabric. Analysis of the pre-printing image data, the pre-drawing image data, and the post-drawing image data results in such a feature value of the fabric.

Analysis of the pre-printing image data results in such a feature value of the fabric before pre-processing. Analysis of the pre-drawing image data results in such a feature value of the fabric subjected to the pre-processing. Analysis of the post-drawing the image data results in such a feature value of the fabric on which the image is drawn. In this manner, by analyzing the image data, the feature value of the fabric that varies depending on the pre-processing and the drawing of the image is obtained.

According to the configuration described above, the control unit can provide the user with the recommended parameter for at least one of the pre-processing device and the post-processing device based on the pre-printing image data, the pre-drawing image data, or the post-drawing image data by the derivation data. The user may obtain predetermined image quality by setting, to the device, the recommended parameter. This makes the user's work easier.

(B) In the information processing device, the pre-printing image data, the pre-drawing image data, and the post-drawing image data may be data obtained by digitizing a region of the fabric having a length of 10 mm or greater and a width of 10 mm or greater at a resolution of 120 dpi or greater.

According to this configuration, the image data suitable for obtaining the recommended parameter can be obtained.

(C) In the information processing device described above, the post-drawing image data may include data obtained by digitizing a front surface of the fabric and data obtained by digitizing a back surface of the fabric.

According to this configuration, the image data suitable for obtaining the recommended parameter can be obtained.

(D) In the information processing device described above, the post-drawing image data may include data obtained by digitizing the fabric in a state of being stretched and data obtained by digitizing the fabric in a state of being not stretched.

According to this configuration, the image data suitable for obtaining the recommended parameter can be obtained.

(E) In the information processing device, the pre-printing image data, the pre-drawing image data, and the post-drawing image data may be data configured to indicate a color image.

According to this configuration, information indicating color is included in the image data, so the image data suitable for obtaining the recommended parameter can be obtained.

(F) In the information processing device, the acquisition unit may be configured to acquire at least one of device data being configured to indicate device information of the pre-processing device and device data being configured to indicate device information of the post-processing device, the derivation data may be configured to indicate a correspondence relationship between the pre-printing image data, the pre-drawing image data or the post-drawing image data, and the device data, and the recommended parameter, and the control unit may be configured to derive, based on the derivation data, the recommended parameter from the pre-printing image data, the pre-drawing image data or the post-drawing image data, and the device data.

According to this configuration, the control unit can provide the user with the recommended parameter for at least one of the pre-processing device and the post-processing device based on the pre-printing image data, the pre-drawing image data, or the post-drawing image data, and the device data.

(G) The information processing method includes an information processing method for processing information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the method including acquiring pre-printing image data and at least one of pre-drawing image data and post-drawing image data, the pre-printing image data being obtained by digitizing, as an image, the fabric before the printing process is performed, the pre-drawing image data being obtained by digitizing, as an image, the fabric after the pre-processing is performed and before the image is drawn, the post-drawing image data being obtained by digitizing, as an image, the fabric before the post-processing is performed and after the image is drawn, and deriving, based on derivation data, a recommended parameter from the pre-printing image data, the pre-drawing image data or the post-drawing image data, the derivation data being configured to indicate a correspondence relationship between the pre-printing image data, the pre-drawing image data or the post-drawing image data, and the recommended parameter for at least one of the pre-processing device and the post-processing device.

According to this method, the same effect as that of the information processing device described above can be obtained.

(H) The non-transitory computer-readable storage medium includes a non-transitory computer-readable storage medium for solving the problems described above includes a non-transitory computer-readable storage medium storing a program for causing a computer to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, wherein the program causes the computer to acquire pre-printing image data and at least one of pre-drawing image data and post-drawing image data, the pre-printing image data being obtained by digitizing, as an image, the fabric before the printing process is performed, the pre-drawing image data being obtained by digitizing, as an image, the fabric after the pre-processing is performed and before the image is drawn, the post-drawing image data being obtained by digitizing, as an image, the fabric before the post-processing is performed and after the image is drawn, and derive, based on derivation data, a recommended parameter from the pre-printing image data, the pre-drawing image data or the post-drawing image data, the derivation data being configured to indicate a correspondence relationship between the pre-printing image data, the pre-drawing image data or the post-drawing image data, and the recommended parameter for at least one of the pre-processing device and the post-processing device.

According to this program, the same effect as that of the information processing device described above can be obtained.

What is claimed is:

1. An information processing device configured to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the information processing device comprising:
   an acquisition unit configured to acquire pre-printing image data and at least one of pre-drawing image data and post-drawing image data, the pre-printing image data being obtained by digitizing, as an image, the fabric before the printing process is performed, the pre-drawing image data being obtained by digitizing, as an image, the fabric after the pre-processing is performed and before the image is drawn, the post-drawing image data being obtained by digitizing, as an image, the fabric before the post-processing is performed and after the image is drawn;
   a storage unit configured to store derivation data configured to indicate a correspondence relationship between the pre-printing image data, the pre-drawing image data or the post-drawing image data, and a recommended parameter for at least one of the pre-processing device and the post-processing device; and
   a control unit configured to derive, based on the derivation data, the recommended parameter from the pre-printing image data, the pre-drawing image data or the post-drawing image data.

2. The information processing device according to claim 1, wherein
   the pre-printing image data, the pre-drawing image data, and the post-drawing image data are data obtained by digitizing a region of the fabric having a length of 10 mm or greater and a width of 10 mm or greater at a resolution of 120 dpi or greater.

3. The information processing device according to claim 1, wherein
the post-drawing image data includes data obtained by digitizing a front surface of the fabric and data obtained by digitizing a back surface of the fabric.

4. The information processing device according to claim 1, wherein
the post-drawing image data includes data obtained by digitizing the fabric in a state of being stretched and data obtained by digitizing the fabric in a state of being not stretched.

5. The information processing device according to claim 1, wherein
the pre-printing image data, the pre-drawing image data, and the post-drawing image data are data configured to indicate a color image.

6. The information processing device according to claim 1, wherein
the acquisition unit is configured to acquire at least one of device data configured to indicate device information of the pre-processing device and device data configured to indicate device information of the post-processing device,
the derivation data is configured to indicate a correspondence relationship between the pre-printing image data, the pre-drawing image data or the post-drawing image data, and the device data, and the recommended parameter, and
the control unit is configured to derive, based on the derivation data, the recommended parameter from the pre-printing image data, the pre-drawing image data or the post-drawing image data, and the device data.

7. An information processing method for processing information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the method comprising:
acquiring pre-printing image data and at least one of pre-drawing image data and post-drawing image data, the pre-printing image data being obtained by digitizing, as an image, the fabric before the printing process is performed, the pre-drawing image data being obtained by digitizing, as an image, the fabric after the pre-processing is performed and before the image is drawn, the post-drawing image data being obtained by digitizing, as an image, the fabric before the post-processing is performed and after the image is drawn; and
deriving, based on derivation data, a recommended parameter from the pre-printing image data, the pre-drawing image data or the post-drawing image data, the derivation data being configured to indicate a correspondence relationship between the pre-printing image data, the pre-drawing image data or the post-drawing image data, and the recommended parameter for at least one of the pre-processing device and the post-processing device.

8. A non-transitory computer-readable storage medium storing a program for causing a computer to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, wherein
the program causes the computer to:
acquire pre-printing image data and at least one of pre-drawing image data and post-drawing image data, the pre-printing image data being obtained by digitizing, as an image, the fabric before the printing process is performed, the pre-drawing image data being obtained by digitizing, as an image, the fabric after the pre-processing is performed and before the image is drawn, the post-drawing image data being obtained by digitizing, as an image, the fabric before the post-processing is performed and after the image is drawn; and
derive, based on derivation data, a recommended parameter from the pre-printing image data, the pre-drawing image data or the post-drawing image data, the derivation data being configured to indicate a correspondence relationship between the pre-printing image data, the pre-drawing image data or the post-drawing image data, and the recommended parameter for at least one of the pre-processing device and the post-processing device.

* * * * *